3,709,738
METHOD OF MAKING A BATTERY SEPARATOR FROM A WEB OF NON-WOVEN POLYMERIC FIBERS
Thomas J. Wetherell, New York, N.Y., assignor to High Energy Processing Corporation, New Bedford, Mass.
No Drawing. Original application Jan. 24, 1969, Ser. No. 793,894. Divided and this application July 6, 1971, Ser. No. 160,130
Int. Cl. H01m 3/00
U.S. Cl. 136—148
2 Claims

ABSTRACT OF THE DISCLOSURE

A method of making a battery separator for alkaline storage batteries of the non-woven fiber mat type; the fiber mat being impregnated with a polymeric binder and a monomeric wetting agent, the thus impregnated mat being subjected to irradiation to form a cross-linked unitary structure.

CROSS REFERENCE TO RELATED APPLICATION

This application is a division of applicant's co-pending application, Ser. No. 793,894, filed Jan. 24, 1969, now Patent No. 3,615,865.

BACKGROUND OF THE INVENTION

Storage batteries of the alkaline type, such as those utilizing a potassium hydroxide electrolyte, have their operational efficiency severely circumscribed by the nature of the separator elements used in the battery.

Various separator elements have been proposed including the fiber mat type having various binder impregnants. It has been found that with known separator elements, high rate charging may be adversely affected; migratory phenomena within the cell may become excessive to thereby reduce the efficiency of the device, and other battery characteristics such as holding a charge, the discharge curve, etc., may be relatively poor.

Accordingly, an object of this invention is to provide an improved method of making a fiber mat battery separator which increases the efficiency of battery charge and discharge.

Another object of this invention is to provide an improved method of making a battery separator of the character described, wherein the fibers of the mat and impregnating agents for the mat are selected so that upon suitable irradiation of the impregnated mat, a cross-linking action takes place as between the several constituents of the mat, to produce a unitary structure having improved properties as they relate to usage in alkaline storage batteries.

Other objects of this invention will in part be obvious and in part hereinafter pointed out.

DESCRIPTION OF THE PREFERRED EMBODIMENT

In accordance with the instant invention, a non-woven fiber mat is formed from selected polymeric fibers of suitable denier and staple length; the mat then being impregnated with an aqueous solution of a polymeric unsaturated organic acid; the impregnated web being then hot calendared to a desired thickness and sprayed with a solution of a monomeric unsaturated organic acid wetting agent. The thus impregnated web is subjected to selected conditions of irradiation to produce cross-linking effects and unitizing the web.

Thus, by way of illustration, a battery separator web of the instant invention was made as follows:

A non-woven fiber web was formed on a Curlator Rando-Webber or other web forming equipment, utilizing polypropylene fibers of 3 denier, 1 9/16" staple length. The web is then saturated with an aqueous solution of polyacrylic acid, which is used in amounts to constitute 5% by weight of the completed article.

The saturated web is then calendared by a stand of heated calendar rolls to a thickness of about 8 mils. The material weight is about 2 oz. per square yard.

The calendared web is then sprayed with an aqueous solution of acrylic acid, in an amount such that the residual acid in the finished product amounts to about 5% by weight thereof.

The impregnated and coated web is then subjected to a 7 mev. linear accelerator to produce an irradiation of about 2 megarads. The resultant product is then converted to battery separator elements in a manner known in the art.

It has been found that the use of battery separators of the instant invention, the efficiency of alkaline type storage batteries using potassium hydroxide electrolyte, as in a nickel-cadmium battery, is substantially improved and such battery is remarkably free of adverse migration phenomena and the like.

It is understood that in lieu of polypropylene fibers; polyethylene or polyamide fibers may be used. Also, the denier of the fibers may range from about 1.5 to about 15.

The web impregnant may be constituted of polymeric unsaturated organic acids such as polymethacrylic acid and polyitaconic acid in lieu of polyacrylic acid. The binder concentration may range from about 2% to about 15% based on the total weight of the finished product.

In place of the acrylic acid wetting agent, other unsaturated organic acid monomers may be used, such as methacrylic acid and the like. The monomer can be combined with a trace amount (1 to 5% by weight) of a monofunctional monomer such as divinylbenzene to reduce the radiation dosage for the cross-linking action.

While the irradiation is preferably of the order of 1 to 2 megarads; the range may be from about 0.5 to 25 megarads.

I claim:

1. A method of forming a battery separator for alkaline storage batteries comprising forming a web of nonwoven polymeric fibers selected from the group consisting of polypropylene, polyethylene and polyamide, impregnating said web with a polymeric binder selected from the group consisting of polyacrylic acid, polymethacrylic acid and polyitaconic acid, hot calendaring the impregnated web, spraying the calendered web with a solution of monomeric unsaturated organic acid and irradiating the sprayed web for a total of about 2 megarads.

2. A method as in claim 1, wherein said fibers are polypropylene, said binder is polyacrylic acid and said monomeric unsaturated acid is acrylic acid.

References Cited

UNITED STATES PATENTS

| | | | |
|---|---|---|---|
| 2,482,062 | 9/1949 | Hanson | 136—146 |
| 3,084,091 | 4/1963 | Volkman et al. | 136—148 X |
| 3,092,519 | 6/1963 | Olson | 136—146 |
| 3,216,864 | 11/1965 | Bushrod et al. | 136—148 |
| 3,240,723 | 3/1966 | Friedlander | 260—2.1 |
| 3,427,206 | 2/1969 | Scardaville et al. | 136—146 |

ANTHONY SKAPARS, Primary Examiner

U.S. Cl. X.R.

117—93.31